United States Patent [19]

Hamuro

[11] 3,883,505

[45] May 13, 1975

[54] METHOD OF SOLUBILIZING POLYSACCHARIDES

[75] Inventor: Junji Hamuro, Tokyo, Japan

[73] Assignee: Ajinomoto Co., Inc., Tokyo, Japan

[22] Filed: May 20, 1974

[21] Appl. No.: 471,189

Related U.S. Application Data

[63] Continuation-in-part of Ser. No. 378,705, July 12, 1973, abandoned.

[30] Foreign Application Priority Data

July 17, 1972  Japan.............................. 47-71454

[52] U.S. Cl.............................. 260/209 R; 424/180
[51] Int. Cl............................................... C07c 3/00
[58] Field of Search .................................. 260/209 R

[56] References Cited
UNITED STATES PATENTS 3,345,556  10/1967  Foster ............................ 260/209 R
3,555,006  1/1971  Storfer ............................ 260/209 R

*Primary Examiner*—Johnnie R. Brown
*Attorney, Agent, or Firm*—Hans Berman

[57] ABSTRACT

Polysaccharides soluble in water are obtained by contacting water-insoluble, naturally occurring polysaccharides with strong, hot, aqueous solutions of urea, thiourea, guanidine, and their N-lower-alkyl derivatives. No change in primary chemical structure nor shortening of polymer chains occurs under mild processing conditions. Polysaccharides may be separated from other constituents of natural raw materials in soluble form by this method.

8 Claims, No Drawings

METHOD OF SOLUBILIZING POLYSACCHARIDES

This application is a continuation-in-part of my copending application Ser. No. 378,705, filed July 12, 1973, and now abandoned.

This invention relates to a method of preparing watersoluble polysaccharides, and particularly to a method of solubilizing polysaccharides without change in primary chemical structure.

Polysaccharides insoluble or only sparingly soluble in water can be solubilized in a known manner by changing their chemical nature, by reducing their degree of polymerization, or both, as by carboxymethylation, phosphorylation, or partial hydrolysis. However, such methods affect properties of the original polysaccharide which may be valuable.

Some polysaccharides, for example, are known to inhibit the growth of Sarcoma 180 in mice while having few undesirable side effects. However, these polysaccharides are so poorly soluble or insoluble in water that they are difficult to administer to mice by injection. They are also recovered from natural sources in low yields and by methods severe enough to alter their structure, such as alkaline or acidic extraction media employed at high temperature. When an attempt is made to improve solubility by the afore-mentioned known methods, much or all of the beneficial effects on mice tumors may be lost.

It has now been found that naturally occurring polysaccharides are at least partly solubilized by contact with aqueous solutions of urea and urea analogs, and that the solubility in water acquired by the treatment is retained thereafter although the urea or urea analog does not enter the polysaccharide molecule, and no primary change in the chemical constitution of the latter is observed. When the treatment is performed under mild conditions, no change in the degree of polymerization of the polysaccharide need accompany the solubilization. While the mechanism of the solubilization process is not fully understood at this time, it is thought to be related to the known effects of urea and guanidine on the solubility of proteins.

Polysaccharides capable of being solubilized, or at least of yielding fractions of solubilized polysaccharides, occur in fungi, bacteria, yeasts, but also in higher plants such as trees and grasses. They include pachyman, lentinan, and other polysaccharides in fungi, also pachymaran which is a β-1,3-glucan obtained from pachyman by sequential oxidation, reduction, and hydrolysis, hemicellulose and xylan in wood, inulin, and other starch normally insoluble or only sparingly soluble in cold water.

The compounds effective in solubilizing polysaccharides according to this invention are of the formula

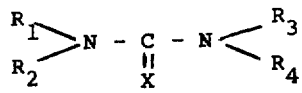

wherein $R_1$, $R_2$, $R_3$, and $R_4$ are identical or different and are hydrogen or alkyl having up to four carbon atoms, and X is oxygen, sulfur, or NH.

The aqueous solutions which bring about the solubilization of a polysaccharide are at least 2-molar. They are effective at any temperature at which water is liquid or held in the liquid state by increased ambient pressure, but the desired effect is achieved only slowly at normal room temperature, and even more slowly at lower temperatures. Relatively quick solubilization is achieved in a pressure vessel at 150°C, for example, but few polysaccharides retain their chain length in an aqueous medium under such conditions, and partial hydrolysis is not always desirable. The preferred operating temperature thus is between 40° and 70°C at which the contact time necessary for maximum solubilization is of the order of 1 hour or somewhat more.

Agitation is beneficial. The pH of the aqueous medium has been found not to affect the solubilization, and may thus be chosen freely for avoiding changes in the polysaccharide structure. The amount of the urea or urea analog solution that is being brought into contact with the solid, polysacchride-bearing material is not critical. Under many circumstances, it is most practical to use 20 to 100 parts by weight of the solution for each part of the solid. The solubilized polysaccharides are generally insoluble or only sparingly soluble in common watermiscible organic solvents, and are thus precipitated when the aqueous solutions are diluted with sufficient solvent, 2 to 5 volumes per volume of aqueous solution being often adequate. The precipitates are pulverulent when dry, and are readily dissolved in water.

The dissolved polysaccharide may be determined colorimetrically by means of phenol-sulfuric acid.

The following Examples are further illustrative of the invention.

EXAMPLE 1

Pachyman was extracted from Poria cocos Wolf by means of an aqueous alkali metal hydroxide solution and recovered in the form of a powder, as is known in itself. One gram of the powder, which is almost insoluble in water, was stirred 5 hours in 50 ml 6-molar aqueous urea solution at 80°C. It dissolved almost completely, and insoluble matter was filtered off by means of a bacteriological filter (Millipore). The filtrate, having a volume of 48 ml, was mixed with 140 ml methanol whereby a precipitate was formed. It was separated from the liquid phase by centrifuging, washed with a small amount of water, and dried in a vacuum. An amorphous powder weighing 720 mg was obtained.

The product dissolved readily in 50ml water while the pachyman employed as a starting material dissolved only at a rate of 1.8 mg/dl at 120°C. The urea treatment thus increased solubility by a factor of about 800 for equal temperature.

The solubilized pachyman was analyzed by electrophoresis on Whatman glass fiber GF 83 (57 cm × 10 cm) with 0.2 M borate buffer solution of pH 9.8 at 2 KV, 150–200 mA, for 45 minutes, and the chromatogram so obtained was developed by spraying with p-anisidine-sulfuric acid reagent and heating at 110°C for 15 minutes. A single spot having the same mobility as a spot produced from the native pachyman was found.

The specific rotation of the water soluble product was $[\alpha]_D^{20} = +16.2°(C = 0.2, H_2O)$ and $+19.1°(C = 1, 2N\ NaOH)$. The intrinsic viscosity of a solution in 0.1 N NaOH at 30° was 0.77. The product had a molecular weight of approximately $3.2 \times 10^5$ as determined by the light scattering method. The infrared spectrum showed only the peaks characteristic of $CH_2$, CH, and OH. The product is soluble in dimethylsulfoxide, but insoluble in acetone, ethanol and other lower alkanols, ethyl ether, and most other common organic solvents.

No nitrogen could be detected within the sensitivity of the equipment employed (0.01%).

The compound is readily decomposed by alkali metal hydroxide in aqueous solution, but is quite stable in an acid medium under conditions which are not overly severe. When heated in a sealed tube at 100°C for 24 hours with the strongly acidic cation exchange resin Dowex 50 W, it was hydrolyzed to D-glucose and laminaribiose, as determined by paper chromatography. When the freeze-dried hydrolyzation product was subjected to trimethylsilylation and gas chromatography, the same hydrolysis products were found.

Two matched groups of ICR-JCL mice were injected subcutaneously with 0.05 ml Sarcoma 180 ascites in the right groin. 24 Hours after the injection and daily thereafter for a total of ten days, the mice in one group were given intraperitoneal injections of aqueous solutions of the solubilized pachyman in doses of 5 mg/kg body weight per injection. After 5 weeks, the mice of the tested group and of the control group were killed, and the tumors, if any, were excised and weighed. The "inhibition ratio" of the solubilized pachyman was determined as the percent reduction in average tumor weight in the tested mice as compared to the mice in the control group, and the complete regression of the tumors was determined in the tested mice.

An inhibition ratio of 95.2% was found in mice treated with the solubilized pachyman, and complete regression was found in eight mice out of ten. By way of comparison, a test performed with the pachyman employed as a starting material showed an inhibition ratio of −8.1%, and no case of complete regression could be found in the five tested mice.

EXAMPLE 2

1 g Batches of pachyman prepared as in Example 1 were heated in 4-molar and 8-molar urea solutions by the procedure of Example 1, and a dry amorphous powder of solubilized pachyman was obtained in respective yields of 640 mg and 601 mg. The two batches of powder were each completely soluble in 50 ml water and otherwise not distinguishable from the product of Example 1 by the chemical and physical tests enumerated above.

Their effects on Sarcoma 180, when tested by the method described above, were also closely similar, inhibition ratios of 95.4 and 94.8% being determined, and complete regression being observed in 7 of 10 and 8 of 10 mice respectively.

EXAMPLE 3

1 g Pachyman powder prepared as in the preceding Example was suspended in 50 ml of a 3-molar aqueous solution of guanidine hydrochloride at 70°C for 24 hours with stirring. The suspension was converted thereby to an almost clear solution which was further worked up as in Example 1. The recovered dry powder weighed 120 mg and dissolved readily in 50 ml water. Its physical and chemical properties were not significantly different from those described in Example 1.

The soluble product, when injected in mice infected with Sarcoma 180 in the manner described in Example 1 produced an inhibition ratio of 92.3% and complete regression of the tumors in 7 out of 10 tested mice.

EXAMPLE 4

Lentinan powder was obtained by extraction of Lentinus edodes in a known manner, and 1 g lentinan powder was stirred in 50 ml aqueous, 6-molar urea solution for 24 hours at 60°C. An insoluble residue was removed by centrifuging, and the supernatant was dialyzed against running tap water for 48 hours, and thereafter against distilled water for 24 hours. The residue was mixed with three times its volume of methanol, and the precipitate formed thereby was collected by centrifuging and dried. It was an amorphous powder weighing 720 mg and completely soluble in 50 ml water in which the initial lentinan was not noticeably soluble.

The soluble powder had the following properties:
$[\alpha]_D^{20} = + 19.8°$ (C = 0.05, $H_2O$)
$[\alpha]_D^{20} = + 21.3°$ (C = 1, 2N NaOH)
$[\eta]^{30}_{0.1 \, N \, NaOH} = 0.41$ Only D-glucose and laminaribiose could be found in a hydrolyzate prepared as in Example 1. Electrophoresis yielded only one spot showing the same mobility as the starting material. The solubility properties and stability in alkaline and acid solutions were as described for the solubilized pachyman of Examples 1 to 3.

The molecular weight of the solubilized lentinan was approximately $9.8 \times 10^5$ as determined by the light scattering method. No detectable amounts of nitrogen were found, and the infrared spectrum showed only the peaks characteristic of $CH_2$, CH, and OH.

When tested on mice infected with Sarcoma 180 in the manner of Example 1, the solubilized lentinan produced 100% inhibition and complete regression of the tumors in all ten tested mice at a dosage rate of only 1 mg/kg as compared to 5 mg/kg used in the preceding Examples.

EXAMPLE 5

1 g Pachymaran powder was solubilized in 50 ml 4-molar urea solution at 80°C for 24 hours. The solution so obtained was worked up as in the preceding Examples to yield 70 mg of a dry, amorphous powder which dissolved completely in 50 ml water. Under the same conditions, only 5 mg of the initially used pachymaran dissolved.

The solubilized product showed the same solubility properties, pH stability, infrared spectrum, and nitrogen content as the soluble pachyman of Examples 1 to 3, and yielded only D-glucose and laminaribiose on hydrolysis. It had the following additional properties:
$[\alpha]_D^{20} = +14.3°$ (C = 0.05, $H_2O$)
$[\alpha]_D^{20} = +19.2°$ (C = 1, 2N NaOHO
$[\eta]_{0.1 \, N \, NaOH}^{30} = 0.24$ The solubilized pachymaran, when applied to mice in the manner of Example 1 at a dosage rate of 5 mg/kg per injection produced an inhibition rate of 98.2% and complete regression of the tumors in 9 out of 10 treated mice.

EXAMPLE 6

1 g Xylan powder was suspended in 50 ml 4-molar aqueous urea solution in the manner of Example 1, and further processed as described in that Example. A dry amorphous powder was ultimately obtained in an amount of 220 mg and completely dissolved in 50 ml water under conditions in which only 45 mg of the untreated xylan could be dissolved in the same amount of water.

The inhibition ratio of Sarcoma 180 was 32.1% at a dosage rate of 200 mg/kg for the soluble product, and only one case of complete tumor regression was observed in ten mice.

EXAMPLE 7

10 g Mycelium of Coriolus versicolor was homogenized in 500 ml 4-molar urea solution, and the mixture was stirred 24 hours at 80°C. Insoluble material was removed by filtration, the filtrate was evaporated to 60 ml, and the concentrate was dialyzed as described in Example 4. The non-dialyzable liquid was diluted with 240 ml methanol, whereby a precipitate was formed. When filtered off and dried, the precipitate constituted 590 mg of an amorphous powder which readily dissolved in 50 ml water.

When hydrolyzed by means of exo-$\beta$-1,3-glucanase derived from Sclerotium libertiatum for 24 hours at 40°C, the powder yielded D-glucose and a small amount of gentiobiose. Nitrogen, phosphorus, and sulfur could not be detected by elementary analysis which showed 40.23% C and 6.97% H. The infrared spectrum indicated the presence of CH, $CH_2$, OH, and of a beta bond (at 890 $cm^{-1}$).

Injections of 25 mg/kg in mice as in Example 1 produced an inhibition ratio of 78.6% and complete tumor regression in 4 out of 10 tested mice.

In a comparison test, 10 g of the same mycelium was homogenized with 500 ml water, and the mixture was stirred 24 hours at 80°C. The mixture was then filtered, the filtrate was evaporated to 70 ml, and the residue was dialyzed as in Example 4. The non-dialyzable fraction was diluted with 350 ml methanol. The precipitate formed thereby was filtered off and dried. The yield of dry amorphous powder was only 160 mg.

EXAMPLE 8

Mycelium of Poria cocos was dried, and 2.3 g of the dry mycelium was stirred with 200 ml aqueous, 6-molar urea solution for 24 hours at 70°C. Insoluble material was filtered off, the filtrate was evaporated to 50 ml, and the concentrate was dialyzed against running tap water for 48 hours and thereafter against distilled water for 24 hours. The non-dialyzable liquid was mixed with three times its volume of methanol, and the precipitate formed thereby was filtered off, washed sequentially with methanol, ether and acetone, and dried. A water soluble polysaccharide mainly composed of glucose units was obtained in an amount of 740 mg.

When 2.3 g of the same dry mycelium was boiled 48 hours in 400 ml water and undissolved material was filtered off, nothing could be precipitated from the filtrate by mixing with five volumes of methanol.

When the mycelium was stirred with 1% sodium hydroxide solution for 24 hours at 70°C, the mixture was filtered, the filtrate was partly evaporated, dialyzed, and then diluted with methanol, 701 mg of a polysaccharide powder was obtained, but its solubility in water was only 1.8 mg/dl at 120°C.

The product prepared from the mycelium by the method of the invention was applied to mice as in Example 1, but at a dosage rate of 25 mg/kg/injection. The inhibition ratio produced thereby was 83.6%, and complete regression of tumors was observed in 6 of 10 mice.

EXAMPLE 9

50 g Coriolus hirsutus, produced in the town of Shiraoi, Japan, was stirred in one liter of a 6-molar solution of urea in water for 5 hours at 70°C, and the mixture was processed as in Example 8 up to the two-stage dialysis. The non-dialyzable solution was freeze-dried to yield 8.3 g water soluble polysaccharide powder. Only 5.9 g of the powder was obtained when the urea was omitted although the volume of water employed was increased to 4 liters.

Hydrolysis of the water soluble polysaccharide powder with exo-$\beta$-1,3-glucanase yielded D-glucose and a small amount of gentiobiose. Elementary analysis did not show detectable amounts of nitrogen, phosphorus, or sulfur, but 41.3% carbon and 6.82% hydrogen. The infrared spectrum indicated the presence of CH, $CH_2$, OH, and beta bond (at 890 $cm^{-1}$). Specific rotation was $[\alpha]_D^{20} = +9.5°$ (C = 1, 2.5 NaOH).

An inhibition ratio of 93.1% and complete regression of Sarcoma 180 in 8 out of 10 mice were observed at a dosage rate of 25 mg/kg in the test method of Example 1.

EXAMPLE 10

Poria cocos was defatted, and 60 g of the defatted material was stirred 16 hours at 100°C in 2 liters of a 6-molar solution of urea in water. Insoluble material was removed by filtration, the filtrate was evaporated to 500 ml in a vacuum, and the concentrate was dialyzed as in Example 8. The non-dialyzable solution was diluted with methanol in a ratio of 1:5, and the precipitate was dried to yield 23.3 g water-soluble pachyman powder closely similar to the product of Example 1 in all other respects, but showing an inhibition ratio of 83.6 and complete tumor regression in 7 of 10 mice when injected in doses of 25 mg/kg.

EXAMPLE 11

10 g Mycelium of Trametes sanguinea was ground in a homogenizer in 500 ml 8-molar urea solution, and the resulting mixture was kept at 80°C for 20 hours with stirring. After removal of insoluble matter by filtering, the filtrate of 450 ml was evaporated to 70 ml, the concentrate was mixed with 350 ml methanol, and the resulting precipitate was filtered off, washed with ethanol, and dried. The water soluble polysaccharide so obtained weighed 1.7 g, and had a main chain bound by $\beta$-1,3-glucoside linkages.

When solutions of the powder were injected in mice infected with Sarcoma 180 as in Example 1, but at a dosage rate of 25 mg/kg, an inhibition ratio of 83.6% and complete regression in 6 out of 10 mice were observed.

When the mycelium was homogenized with water, and the mixture was further treated as described above, the amount of polysaccharide powder obtained was only 160 mg.

EXAMPLE 12

10 g Holocellulose isolated from wheat straw was stirred 24 hours at 70°C with 500 ml aqueous 8-molar urea solution. The mixture was stripped of undissolved material by filtering, and the filtrate was partly evaporated and dialyzed as in Example 4. The non-dialyzable liquid amounted to 100 ml and was diluted with 400 ml ethanol. The precipitate formed thereby was filtered off, washed with ethanol, and dried. It weighed 1.51 g, was readily soluble in water, and mainly consisted of xylan.

When injected in mice at a dosage rate of 200 mg/kg in the test procedure of Example 1, it produced an 82.4% inhibition of tumor growth, and complete regression of tumors was observed in 4 out of 10 mice.

When 10 g of the same holocellulose was stirred in one liter 1-N sodium hydroxide solution at 25°C for 10 hours, and the mixture was then worked up as described above, a polysaccharide powder containing little xylan was obtained in an amount of 1.1 g.

EXAMPLE 13

Crushed hemlock wood was extracted with acetone and dried. 20 g Extracted dry wood was stirred 24 hours at 70°C with 2 liters aqueous 8-molar urea solution. After removal of insoluble material, the solution was evaporated to 100 g in a vacuum, dialyzed as in Example 8, and mixed with 300 ml ethanol. The precipitate formed was filtered off, washed with ether, and dried. A water-soluble polysaccharide powder was obtained in an amount of 1.4 g. It mainly consisted of galactoglucomannan.

The injection of aqueous solutions of the material into mice infected with Sarcoma 180 at a dosage rate of 100 mg/kg, otherwise using the procedure described in Example 1, caused inhibition of tumor growth in a ratio of 76.2%, 4 out of 10 tested mice showing complete regression of the tumors.

When the extracted dry wood was stirred with water without urea, and the mixture was further processed as described above, only 0.2 mg dry galactoglucomannan powder containing little galactose was obtained from 20 g of the starting material.

EXAMPLE 14

500 mg Pachyman was stirred with 50 ml aqueous, 3-molar N-methylurea solution at 70°C for 24 hours. The mixture so obtained was filtered to remove insoluble matter, and the filtrate was mixed with a large excess of methanol to precipitate a water-soluble pachyman which weighed 408 mg when washed and dried.

The physical and chemical properties of the material were closely similar to those reported in Example 1. When applied to Sarcoma 180 infected mice as in Example 1, but at a rate of 25 mg/kg, it produced an inhibition ratio of 92.8%, and 5 out of the 10 tested mice were entirely free of tumors.

EXAMPLE 15

The procedure of Example 14 was repeated with five batches of the same pachyman, but the N-methylurea was replaced by thiourea, N,N-dimethylurea, N,N-dimethylurea, N,N,N',N'-tetramethylurea, and 1,1,3,3-tetramethylguanidine hydrochloride respectively in equimolecular amounts. The several mixtures yielded water-soluble pachyman powders in respective amounts of 442, 224, 170, 329, and 102 mg.

The powders were tested for their effects on Sarcoma 180 in mice as described in Example 1. At a dosage rate of 5 mg/kg, the inhibition rates observed were 92.8%, 93.6%, 91.4%, 94.2%, and 83.2% respectively in the order in which the urea derivatives are listed above. The number of mice, out of groups of ten, which showed complete remission, was 7, 7, 6, 7, and 5 respectively.

Woods other than the spruce wood referred to in Example 13 and grasses other than the wheat referred to in Example 12 were found to yield water-soluble polysaccharides upon contact with solutions of urea and urea analogs. The Basidiomycetes employed in Examples 1–4, 7–11, 14 and 15 are similarly representative of microbial sources of water-soluble polysaccharides. I have not been able to find any polysaccharide-bearing natural organic matter from which a water-soluble polysaccharide fraction could not be recovered by the method of this invention without chemical action on the native polysaccharide.

While the invention has been described with particular reference to specific embodiments, it is to be understood, therefore, that it is not limited thereto, but is to be construed broadly and restricted solely by the scope of the appended claims.

What is claimed is:

1. A method of improving the solubility of a polysaccharide poorly soluble in water which comprises:
   a. contacting said polysaccharide with an aqueous solution of at least two moles per liter of a compound of the formula

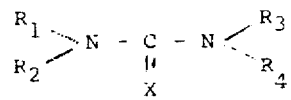

wherein $R_1$, $R_2$, $R_3$, and $R_4$ are selected from the group consisting of hydrogen and alkyl having up to four carbon atoms, and X is oxygen, sulfur, or NH until said polysaccharide is dissolved in said solution; and
   b. recovering said polysaccharide in water-soluble form from said solution.

2. A method as set forth in claim 1, wherein said polysaccharide, prior to said contacting, is derived from a member of the group consisting of fungi, bacteria, yeasts, wood, and grass.

3. A method as set forth in claim 1, wherein said polysaccharide, prior to said contacting, is derived from living matter.

4. A method as set forth in claim 1, wherein said polysaccharide is a β-1,3-glucan.

5. A method as set forth in claim 2, wherein said member is Coriolus versicolor, Coriolus hirsutus, Trametes sanguinea, and holocellulose.

6. A method as set forth in claim 2, wherein said member is Poria cocos.

7. A method as set forth in claim 1, wherein said polysaccharide is pachyman, lentinan, xylan, or galactoglucomannan.

8. A method as set forth in claim 1, wherein said polysaccharide is contacted with said solution for at least 1 hour at a temperature of 40° to 70°C.

* * * * *